Patented Mar. 28, 1939

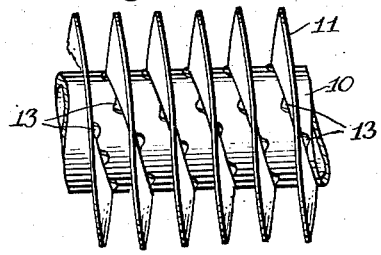
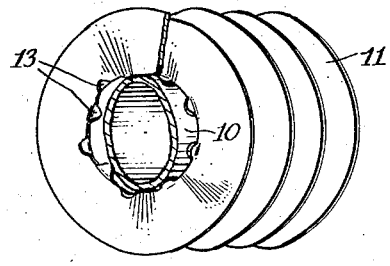
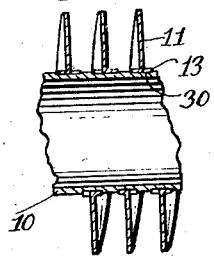
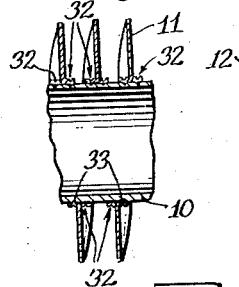
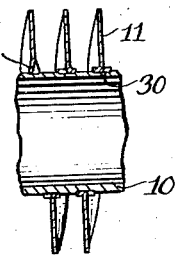
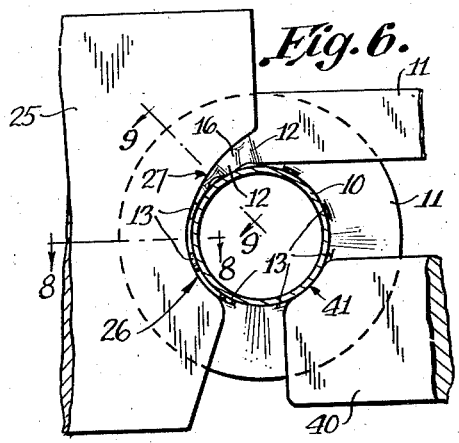
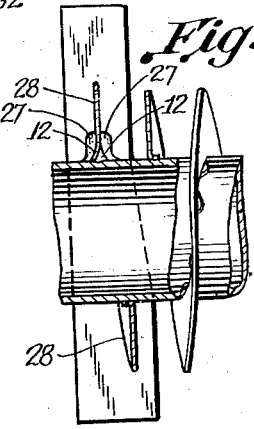
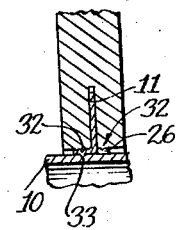
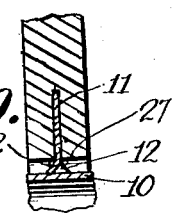
INVENTOR.
ALFRED J. BERG
BY
ATTORNEYS.

2,151,685

UNITED STATES PATENT OFFICE 2,151,685

APPARATUS FOR AND PROCESS OF MAKING REINFORCED TUBING

Alfred J. Berg, Portsmouth, N. H.

Application February 14, 1936, Serial No. 63,899

5 Claims. (Cl. 153—64.5)

(Granted under the act of March 3, 1883, as amended April 30, 1928; 370 O. G. 757)

My invention relates to a reinforced tube or body and a method of producing the same.

The objects of my invention are to make a very light pipe or tube of great strength as well as afford a pipe or tube of attractive appearance which shall be uniformly smooth and free from irregularities in which may accumulate dirt, dust and other foreign matter.

A further object of my invention is to provide a reinforced pipe or tube very light in weight and of great strength in which the reinforcement projects at intervals about the tube and prevents undue thinning of the wall of the tube by wear and in which the surfaces of the reinforcement are uniformly smooth and free from irregularities which may invite the formation of deposits of dust or other foreign matter.

A further object of my invention is to provide a new and useful process by which the reinforced pipe or tube may be made commercially, and which process may be performed by hand.

In the accompanying drawing illustrating my invention, Fig. 1 is a top plan view of a portion of the reinforcing band helically preformed about the tube or body.

Figure 2 is a perspective view of the subject of Fig. 1, with joints broken away and disclosing the securing feet formed alternately at intervals upon the inner edge of the reinforcing band;

Fig. 3 is a central longitudinal sectional plan view of a portion of a pipe or tube provided with my helical reinforcing band;

Figs. 4 and 5 are views similar to Fig. 3 but showing different securements of the feet;

Fig. 6 is an end view with the tube in cross-section and other parts broken away for clearness illustrating an apparatus for making the heat or cold exchanging element in accordance with my invention;

Fig. 7 is a side elevation view of parts shown in Fig. 6 with portions of the tube and its rib being in section;

Fig. 8 is a sectional view taken on line 8—8 of Fig. 6;

Fig. 9 is a sectional view taken on line 9—9 of Fig. 6.

In the drawing, in which like characters of reference indicate the same parts, 10 is the tube or other body which may be hollow and which is to be reinforced and whose wall I consequently prefer to have relatively thin for the character of service and pressure to which the same is to be subjected. For the reinforcing band or bands I prefer to employ a metallic strip 11, preferably of very thin metal bent edgewise about the tube.

This bending may be to form a series of rings about the tube, or the one continuous strip 11 may be bent edgewise about and around the exterior of tube 10 in the form of a helix. Whether the reinforcing band or strip 11 be bent in the form of separate rings or in a helix about the tube 10, the edgewise bending of the relatively wide thin strip of metal 11 about tube 10 is designedly permitted to form wrinkles 12 at its inner edge about the tube, Figs. 5, 6, 7, and 9, alternately arching first to one side and then to the other of the periphery of the coiled reinforcing strip. These wrinkles, as indicated in Figs. 5, 6, 7, and 9 when completed by the progressive bending or coiling of the reinforcing strip 11 about the tube, the wrinkles 12 are each segmental, or piece of pie shaped, wider at the surface of the tube and having their apex lying within the width of the reinforcing strip 11. The purpose of forming such wrinkles 12 is threefold. The primary purpose of their formation is to enable the securing feet 13, Figs. 1 through 5 to be formed therefrom; a further purpose of the formation of such wrinkles 12 is for the greater convenience and cheapness of manufacture of the reinforced pipe or tubing by substantially lessening the longitudinal stress upon ribbon 11 otherwise required in such bending about the tube which also enables the reinforced pipe or tubing to be made by apparatus subjected to substantially less wear, and consequently having longer useful life, than would be the case with apparatus required in such bending without wrinkling the reinforcing strip 11 in that the same enables very much wider strips 11 to be bent edgewise about the tube than is possible of accomplishment where the reinforcing strip is not so wrinkled in such bending.

Prior practices require very substantial stress and great wear with short life of the apparatus for bending a flat strip edgewise about the tube without wrinkling. In such practice the width of the flat strip so bent can only be approximately half the diameter of the pipe without precoiling; but in accordance with applicant's invention the width of the reinforcing strip may be substantially wider.

In the prior practice, the edgewise coiling of a flat wide thin strip about a tube or other arched surface without wrinkling has required that the strip 11 as it is fed toward edgewise contact with the tube or arched surface must be maintained under very substantial longitudinal stress of a magnitude sufficient to stretch the metal during the period that, and at the progressive points where, molecular action of the metal of the strip is taking place in the edgewise bending of such strip about the tube or arched surface. This longitudinal stress upon the strip 11 occasions a substantial lateral thrust upon the tube or arched surface of the body 10 while the same is being rapidly rotated in the coiling of the strip at the rate required for most economical production. Such lateral stress applied to the tube or body 10 at points progressively varying throughout its length, during the rotation of the tube or body 10, tends to laterally deflect the tube or body 10 at a rapid rate and exerts a crystallizing and weakening influence upon the metal of such tube or body 10. A steady rest has been employed in the prior practice to reduce as far as practicable the amplitude of such vibrations of the tube or body 10 while being helically finned or ribbed, but such steady rests mar and wear the surface of the tube or body 10 due to the magnitude of said lateral stress upon the rotating pipe or body 10.

In my present invention, the very wide thin strip of metal 11 is loosely lead into contact with an end tube or body 10, with one lateral edge of an end of strip 11 in contact with and secured by solder or otherwise to the outer surface of the tube or body 10. This initial securement of the strip 11 to tube or body 10 occupies but a small area. An area at both sides of the outer portion of said strip 11 is closely confined by surfaces 28 which hold the strip 11 in its upright position as the same is to be formed about the tube or body 10. The area of such confinement being at least the area in which the strip 11 undergoes stretching and compression stresses while being edgewise bent about the tube or body 10. Adjacent the surface of tube or body 10 and on opposite sides of the flat strip 11 is a tangential area 16 in which strip 11 is unconfined on both of its sides, in the area in which the strip 11 is subjected to compression stress while being bent about the tube or body 10. By this partial confinement and partial freedom from confinement of opposite sides of the strip 11, in accordance with my invention, I avoid the lateral deflections of tube or body 10, and the consequences thereof, that have heretofore resulted from the leading of the strip 11 edgewise toward the tube or body 10 under the heretofore required substantial longitudinal stress. In the present invention the strip 11 may be lead edgewise to tube or body 10 under substantially no longitudinal stress. A further advantage of my invention is that in prior practice much greater power was required to wind the flat strip 11 edgewise about the tube or body 10 without permitting the same to wrinkle, whereas with my invention substantially less power is required in so bending the strip 11 as to permit a controlled wrinkling of the inner edge of strip 11 together with the transformation of the wrinkles into the feet 13.

As the strip 11 is progressively bent edgewise about the tube or body 10, each wrinkle 12 is successively formed alternately on opposite sides within the wrinkle controlling area 16 on opposite sides of strip 11. Subsequently each wrinkle 12 is smoothed out by hand or by any suitable tool. In this smoothing out of each wrinkle 12 the metal content of each wrinkle 12 is smoothed or worked inwardly toward the exterior surface of the tube in a plane coincident with the outer periphery of the strip 12 and of a thickness substantially corresponding to the thickness of the bent strip 12 at its periphery. The surplus metal resulting from such smoothing of each wrinkle 12 results in the formation of a foot 13 extending laterally from the inner edge of the bent strip 11, and such feet 13 alternate on opposite sides of said edge substantially coincident with each smoothed out wrinkle. The wrinkles 12 which are provided and permitted to form on the inner edge of strip 11 within the area 16, Fig. 6, may be ironed out leaving a flat strip 11 unwrinkled at its inner edge and the surplus metal that was in the wrinkles being transformed into the alternating feet 13 by the edge of the confining surfaces 28 coinciding with the outer edge of the tangential free and unconfined surface 16 of the strip 11 while being bent about the tube or body 10. In such case said coinciding edges would be the corresponding coincident edges of a metallic member upon opposite sides of strip 11.

Each foot 13, or each selected foot 13, is then suitably secured to the tube. One form of such securement as indicated in Figs. 3 and 5 is that such feet are pressed with their inner surfaces a slight distance below the normal exterior surface of the metal of the tube or body 10. This results in a multiplicity of different angular-shaped and positioned portions of feet 13 being interlocked into slight recesses in the exterior surface of the tube or body 10 thereby forming a rigid securement of the reinforcing strip to the tube.

The feet 13 of Figs. 4 and 8 are similarly formed, but instead of the whole or a substantial area of each one, or certain selected ones, of the feet 13 being depressed into metal of the tube or body 10 as indicated in Figs. 3 and 5, the feet 13 of Figs. 4 and 8, or selected ones thereof, are secured to the tube 10 by having at least one relatively slight depression formed therein. In forming each depression 32 some metal of foot 13 is thrust inward, thereby forming in the exterior surface of tube or body 10 a relatively slight depression 33, registering with depression 32 and interlocking metal of the feet 13 with metal of the tube. This forms a substantial securement of the reinforcing strip to the tube or body 10.

In commencing to form the reinforced pipe or tube in accordance with my invention an end of a strip 11 may be brought into edgewise contact with a portion of the exterior surface of tube or body 10 and the same at such point initially soldered or otherwise secured together. The strip 11 may then be bent in either a ring or helix as may be desired about tube or body 10 either by hand or by apparatus. In either hand or apparatus coiling there is relative revolvable motion of tube or body 10 and the unbent portion of the strip 11.

The wrinkles 12 are shown more clearly in Figs. 5, 6, 7, and 8. The length of wrinkles 12 in the width of bent strip 11 may be controlled by confining the desired extent of the outer edge of strip 11, at the time it is being bent or coiled about the tube or body 10.

In the apparatus diagrammatically disclosed in Figs. 6 through 9, 25 represents a tool steel dye plate adapted to be mounted upon the cross-slide of a lathe or like tool between whose centers the tube or body 10 is mounted to revolve. The edge of plate 25 is provided with a surface 26 conforming to the arc of a circle concentric with the center of the tube or body 10, and which surface merges into a surface 27 tangent to said surface 26. Extending into said surfaces 26 and 27 and the adjacent surfaces of the inner end of plate 25 is a groove 28 which conforms to the thickness and arc into which the strip 11 is to be bent and formed. The tangential surface 27 at its highest point extends only to a point within the width of the strip 11, and in the instance shown in Fig. 6 the same extends to a point approximately one-half the width of strip 11. The groove 28 confines the strip 11 while being bent so as to maintain the same free from wrinkles, while the space between the tangential surface 27 and the outer surface of tube or body 10 invites the formation of wrinkles 12 in the progressive bending of strip 11 edgewise about the tube or body 10. As such wrinkles 12 are formed in such space progressively with the bending of strip 11 with the apex of each of said wrinkles 12 being at or adjacent the surface 27 near or at its wider divergence from the exterior surface of tube or body 10, the rotation of tube or body 10 with the edge of the end of strip 11 secured thereto and entering the groove 28 in plate 25 the strip 11 commences to progressively bend about the tube or body 10 and the wrinkles 12 to progressively form within the entrance to the space represented by the tangential surface 27 of plate 25 and the adjacent surface of tube or body 10. As the tube or body 10 further revolves with its secured end of the strip 11, the tangential surface 27 of plate 25 progressively upon opposite sides of strip 11 smooths out the wrinkles 12 by pressure applied substantially radially inward toward the surface of tube or body 10 against which said surface 27 deposits the surplus metal from each wrinkle 12 in the form of such deposited foot 13. Each of these feet 13 is in the instance shown in Figs. 3 and 5 pressed inwardly against and below the exterior surface of the tube or body 10 forming a slight depression 30 therein. This is accomplished by the emerging surfaces 26 and 27. Such feet 13 being so depressed into said depressions 30 at separated points about the arched surface of the tube or body 10 affords such a substantial interlocking of the metal of strip 11 and the tube or body 10 in such spaced and angular relationships to each other as to afford a rigid substantially permanent securement together of the strip 11 and tube or body 10. In such secured position the inner edge of strip 11 is in firm engagement throughout its extent with the outer surface of the tube or body 10. While there is required to be no substantial longitudinal stress in the strip 11 as the same approaches the tube or body 10 there is therefore no lateral thrust upon the tube or body 10. There is, however, in the bending of strip 11 about the tube or body 10 designedly set-up longitudinal stress especially at the outer edge of the bent strip 11, which longitudinal stress progresses from a point in the width of the strip 11 substantially coincident with that of the apex of each of the progressively formed wrinkles 12. This longitudinal stress in the bent strip 11 does not occasion any lateral stress upon the tube or body 10 because such longitudinal stress is occasioned by the, in effect, radial stretching of the stated outer edge of the strip 11 while the same is being formed about the tube or body 10, and which stress is only unidirectional about the tube or body 10.

In smoothing out the wrinkles 12 and forming therefrom the feet 13, by tangential surface 27 of plate 25, there results a slight lateral thrust upon the tube or body 10 which is neutralized by a steady rest bar 40 supported by the crossslide of the aforementioned lathe or like tool. This bar 40 is provided with a surface 41 adapted to engage the exterior surface of tube or body 10 at a point diametrically opposite the tangential surface 27 which occasions said thrust.

Instead of the feet 13 being depressed into and forming depressions 30 in the exterior surface of the tube or body 10 the feet 12, in accordance with the form of my invention illustrated in Figs. 4 and 8, are firmly pressed against the outer virgin surface of the tube or body 10. A slight ridge 32 projects from surface 26 on opposite sides of the strip 11. Said ridges form slight depressions 33 in the exterior surface of each foot 13 and force the adjacent metal of each foot 13 inwardly to cause a corresponding depression 33 in the exterior surface of the tube or body 10. The metal of each foot 13 between said depressions 32 and 33 by the nature of such interlock as well as the spaced apart and different angularity of the interlocked metal of each foot with the metal of the tube or body 10, forms a rigid and practically permanent securement of the strip 11 to the tube or body 10.

In Fig. 9 the surfaces 27 are shown to have only partially straightened out the wrinkle, but it will be readily understood therefrom by those skilled in the art that there is sufficient surplus metal of each wrinkle, left after smoothing out each wrinkle, to form each foot 12 by scraping this surplus metal inwardly toward the surface of the element.

While I have indicated but one form of apparatus by which my invention may be practiced, in addition to the disclosure that the same may be practiced by hand as well as the number of different kinds of apparatus, the disclosure of said facts will facilitate the understanding of my invention by those skilled in the art as well as more readily enable such skilled persons to select, adapt, and employ different forms of other apparatus for the practice of my invention.

It will be understood by those skilled in the art that my invention concurrently and progressively wrinkles the inner edge and stretches the outer edge of the strip 11 while being wound edgewise about the tube or body 10; that the wrinkling of the inner edge very substantially lessens the power required to bend the strip 11 and that a wider, thinner strip 11 may be employed by my invention than was possible under prior practices; that the ironing out of the wrinkles 12 into the feet 13 cold works the inner portion of the width of the edgewise bent strip 11 about the tube or body 10 and increases the rate of conductivity of heat or cold by way of the inner portion of strip 11 to and from the tube or body portion 10; that the progressive stretching of the unwrinkled portion of the width of the strip 11, while being wound about the tube or body 10, affords such a cold working of such portion of strip 11 as to substantially increase the rate of conductivity of heat or cold by way of said portion of said strip 11 to and from the tube or body 10, and also retains in certain outer portion of the width of the bent strip 11 a longitudinal stress, lesser in degree than required to stretch the metal of strip 11, but exerting a substantial stiffening effect upon said portion of the width of strip 11 as to maintain the stability of the formed strip 11 and increase its resistance to accidental lateral bending or deformation by thinner metal of strip 11 than was heretofore possible with thicker strips of metal; that the thinness of the wall of the tube or body 10 and the greater thinness and width of the form of the bent strip 11 very greatly decreases the cost of production of my new and useful heat or cold exchanging element as well as very greatly increases its lightness, rate of heat or cold exchanging capacity and durability; and that the product and process portions of my unitary, related and independent invention possesses other inherent advantages which may be readily understood.

The substantial lesser weight of metal required in the construction of my present invention, without departing from the strength and durability of the resulting product, together with the increased efficiency of the resulting product in the increased rate at which it may exchange heat or cold, each involve substantial savings in the money cost of the material, in the size and weight of and space required for each unit of a given capacity afford great savings not only in the production, but also in the use of the resulting product portion of my invention. It will be further likewise understood that even small savings in the production and use of each foot in length of each of the elements, Fig. 1, of my invention are multipliable by the number of feet required and/or the number of days in each year in which the same is used, and that the result will be a more comprehensive indication of the advancement in the art achieved by this invention.

This invention may be made and used by or for the Government of the United States of America for governmental purposes without the payment of any royalty thereon or therefor.

Having now so fully described my invention that others skilled in the art may therefrom make and use the same, what I claim and desire to secure by Letters Patent is:

1. In apparatus for making a reinforced tube having a rib extending edgewise there-about, comprising a die having a recess in one edge thereof adapted to receive a portion of the tube, said die edge having a slot therein adapted to receive and laterally support the rib forming metal, and said die having a progressively decreasing depth of lateral supporting slot to smooth out the wrinkle on the inner edge of the rib forming metal and to displace some of the metal of the wrinkle toward and into binding contact with the metal of the reinforced tube.

2. The process of making a reinforced member which comprises the steps of bending a metal strip edgewise on the said member and conforming one edge thereof to the desired surface of said member by wrinkling said strip at least at said conformed edge, and smoothing out the wrinkles to form laterally projecting feet at the conformed edge of said strip.

3. The process of making a reinforced member which comprises the steps of bending a metal strip edgewise on the said member and conforming one edge thereof to the desired surface of said member by wrinkling said strip at least at said conformed edge, and smoothing out the wrinkles by pressing the metal of the wrinkled portion of the strip toward the said member to form laterally projecting feet at the conformed edge of said strip.

4. The process of making a reinforced member which comprises the steps of bending a metal strip edgewise on the said member and conforming one edge thereof to the desired surface of said member by wrinkling said strip at least at said conformed edge, smoothing out the wrinkles by pressing the metal of the wrinkled portion of the strip toward the said member to form laterally projecting feet at the conformed edge of said strip, and pressing at least a portion of some of said feet into the exterior surface of said member.

5. An apparatus for making a reinforced body having a rib extending edgewise thereabout, comprising a die having a slot in an edge thereof adapted to receive and laterally support the rib forming metal, the said slot having a varying depth which is least at that end where the rib forming metal is initially inserted and the slotted edge of said die being provided with a surface for pressing the rib forming metal in a direction outwardly of said slot and into intimate contact with the body to be ribbed.

ALFRED J. BERG.